United States Patent
Bai et al.

(10) Patent No.: US 10,717,652 B2
(45) Date of Patent: Jul. 21, 2020

(54) METHOD FOR PREPARING LARGE GRAPHENE SHEETS IN LARGE SCALE

(71) Applicant: SHANGHAI KYORENENEW MATERIALS TECHNOLOGY CO., LTD, Shanghai (CN)

(72) Inventors: Yongxiao Bai, Shanghai (CN); Xinjun Hu, Shanghai (CN); Yan Sha, Shanghai (CN); Xiaolin Sha, Shanghai (CN)

(73) Assignee: SHANGHAI KYORENENEW MATERIALS TECHNOLOGY CO., LTD, Shanghai (CN)

( * ) Notice: Subject to any disclaimer, the term of this patent is extended or adjusted under 35 U.S.C. 154(b) by 521 days.

(21) Appl. No.: 15/525,584

(22) PCT Filed: Mar. 12, 2015

(86) PCT No.: PCT/CN2015/074139
§ 371 (c)(1),
(2) Date: May 9, 2017

(87) PCT Pub. No.: WO2016/074393
PCT Pub. Date: May 19, 2016

(65) Prior Publication Data
US 2017/0334727 A1    Nov. 23, 2017

(30) Foreign Application Priority Data
Nov. 14, 2014  (CN) .......................... 2014 1 0647957

(51) Int. Cl.
*C01B 32/184*    (2017.01)
*B82Y 30/00*    (2011.01)
(Continued)

(52) U.S. Cl.
CPC ............ *C01B 32/184* (2017.08); *B82Y 30/00* (2013.01); *C01B 32/194* (2017.08); *C01B 32/23* (2017.08);
(Continued)

(58) Field of Classification Search
CPC ..... C01B 32/184; C01B 32/23; C01B 32/194; C01B 2204/02; C01B 2204/04;
(Continued)

(56) References Cited

U.S. PATENT DOCUMENTS 9,452,934 B2   9/2016  Kim et al.
9,527,742 B2   12/2016 Choi et al.
(Continued)

FOREIGN PATENT DOCUMENTS

CN          102020270       *  4/2011    ............. C01B 31/04

OTHER PUBLICATIONS

Machine translation of CN 102020270 to Institute of Metal Research of Chinese Academy of Sciences (Year: 2011).*
(Continued)

Primary Examiner — Daniel C. McCracken

(57) ABSTRACT

A method for preparing large graphene sheets in large scale includes steps of: under a mild condition, processing graphite powders with intercalation through an acid and an oxidant; washing away metal ions and inorganic ions in the graphite powders with dilute hydrochloric acid, then filtering and drying; and, finally processing with a heat treatment. The present invention breaks through a series of bottlenecks restricting an efficient preparation of graphene that result from a traditional method of using large amounts of deionized water to wash graphite oxide to be neutral, and easily realizes a batch production. A radial scale of the prepared graphene sheets is distributed from 20 um to 200 um.

7 Claims, 3 Drawing Sheets

(51) Int. Cl.
*C01B 32/194* (2017.01)
*C01B 32/23* (2017.01)
*H01B 1/04* (2006.01)
*B82Y 40/00* (2011.01)

(52) U.S. Cl.
CPC ............... *H01B 1/04* (2013.01); *B82Y 40/00* (2013.01); *C01B 2204/02* (2013.01); *C01B 2204/04* (2013.01); *C01B 2204/32* (2013.01)

(58) Field of Classification Search
CPC . C01B 2204/32; C01B 32/182; C01B 32/198; C01B 2204/00; C01B 2204/06; C01B 2204/065; C01B 2204/20; C01B 2204/22; C01B 2204/24; C01B 2204/26; C01B 2204/28; C01B 2204/30; C01B 32/20; C01B 32/205; C01B 32/21; C01B 32/215; C01B 32/22; C01B 32/225; H01B 1/04; B82Y 30/00; B82Y 40/00
See application file for complete search history.

(56) References Cited

U.S. PATENT DOCUMENTS

| | | |
|---|---|---|
| 9,527,745 B2 | 12/2016 | Yu et al. |
| 9,536,735 B2 | 1/2017 | Son et al. |
| 9,550,679 B2 | 1/2017 | Zhang et al. |
| 2010/0055025 A1* | 3/2010 | Jang ........................ B82Y 30/00 423/448 |
| 2012/0129736 A1* | 5/2012 | Tour ........................ B82Y 30/00 507/140 |

OTHER PUBLICATIONS

Xiuyi Lin et al., Fabrication of Highly-Aligned, Conductive, and Strong Graphene Papers Using Ultralarge Graphene Oxide Sheets, ACS NANO, 2012, 10708-10719, vol. 6, No. 12.

Matthew J. Allen et al., Honeycomb Carbon: A Review of Graphene, Chemical Reviews, 2010, 132-145, vol. 110, No. 1.

A.K. Geim et al., The rise of graphene, Nature materials, 2007, 183-191, vol. 6.

* cited by examiner

METHOD FOR PREPARING LARGE GRAPHENE SHEETS IN LARGE SCALE

CROSS REFERENCE OF RELATED APPLICATION

This is a U.S. National Stage under 35 U.S.C 371 of the International Application PCT/CN2015/074139, filed Mar. 12, 2015, which claims priority under 35 U.S.C. 119(a-d) to CN 201410647957.5, filed Nov. 14, 2014.

BACKGROUND OF THE PRESENT INVENTION

Field of Invention

The present invention relates to a method for preparing large graphene sheets in large scale.

Description of Related Arts

Graphene is a two-dimensional honeycomb lattice structure in the monoatomic layer formed of carbon atoms through $sp^2$ hybridization. The graphene exists as two-dimensional crystal structures. With a thickness of only 0.334 nm, the graphene is the thinnest material already known in the world at present, and also the basic unit constructing carbon materials of other dimensions. The graphene can wrap up to form zero-dimensional fullerenes, roll up to form one-dimensional carbon nanotubes, and stack layer upon layer to form the three-dimensional graphite (Allen M J, Tung V C, Kaner R B. *Honeycomb carbon: A review of graphene* [J]. *Chemical Reviews*, 2010, 110(1): 132-145). Because of the special two-dimensional structure, the graphene has many special properties. The theoretical specific surface area of the graphene is up to 2,630 $m^2/g$, and the graphene has an ultra-high Young's modulus (up to 1,100 GPa) and breaking strength (125 GPa) as well as the excellent heat transformation (up to 5,000 W/(m×k)) and carrier transformation ($2 \times 10^5$ $cm^2/v$). In addition, the graphene has many other features in terms of electrical and magnetic properties, e.g. the quantum Hall effect at a room temperature, a bipolar field effect, ferromagnetism and superconductivity. The excellent properties render the graphene a broad application prospect in such fields as nano-electronic devices, gas sensors, energy storage and composites (Geim A K, Novoselov K S. *The rise of graphene* [J]. *Nature Materials*, 2007, 6(3): 183-191).

Though countries around the world have proposed many methods for preparing the graphene by far, the radial scale of the prepared graphene sheets are small, and the worse thing is that subsequent processes requiring the ultrasonic exfoliation severely damage edge structures of the graphene. Due to the huge instantaneous impact energy from the ultrasound and the instantaneous high temperature micro-environment of the reaction part of materials and the medium, the graphene sheet is fragmented into the micron, submicron and even nano-scale radial sheet size under the strong shear and impact. It is thus difficult to obtain the graphene of large-sized sheet structures from preparation processes of chemical oxidation and ultrasonic exfoliation of the existing liquid-phase oxidation reduction method. Meanwhile, chemical exfoliation is currently inseparable from the water washing process, after which a great cohesion emerges between the graphite oxide sheets, leading that the viscosity of the graphite oxide becomes very large instantaneously. Thus, not only the cleaning process for further removing ions and impurities becomes extraordinarily difficult, but also longer time and larger consumption of power are required to finish washing, filtering and drying of the graphite oxide. Moreover, the great cohesion makes the spacing between the sheets of the intercalated graphite oxide develop reversely, i.e. the spacing between the sheets of the graphite oxide will somewhat decrease, which leads to the increasingly difficult exfoliation of the graphene and is negative for the exfoliation of the sheets. To achieve the effective ultrasonic exfoliation and sheet exfoliation, the ultrasonic treatment of more power and longer time is needed. It is conceivable that exposure to the intense ultrasound and the cavitation condition for a long time will cause a heavy damage to the crystal structure of the graphite oxide, resulting in loss of some properties of the prepared graphene, which is another bottleneck for preparing the graphene by chemical exfoliation of the existing liquid-phase oxidation reduction method. In addition, the chemical exfoliation of the existing liquid-phase oxidation reduction method requires a very long time and an enormous power consumption to finish off washing and filtering processes of the graphite oxide, which significantly raises the preparation cost of the products and dramatically reduces the production efficiency. In short, harsh preparation conditions, a complex process, a low efficiency and a small radial sheet scale are universal in the process of preparing the graphene by the existing liquid-phase chemical exfoliation method. The prepared graphene is more defective in the lattice, and has a severe damage in the $sp^2$ hybridization structure and larger loss of intrinsic properties due to overoxidation and violent reactions. As a result, it is necessary and urgent to develop a method for preparing the graphene in large scale, with the mild intercalation, the simple process, the highly-efficient production and the large radial sheet size.

The size of the graphene sheet has a decisive impact on the electrical conductivity of electronic devices and composites and on such properties as mechanical properties, antistatic behavior, gas barrier resistance, electrical and thermal conductivity of graphene-polymer nanocomposites (Lin X, Shen X, Zheng Q, Yousefi N, Ye L, Mai Y-W, et al. *Fabrication of Highly-Aligned, Conductive, and Strong Graphene Papers Using UltralargeGraphene Oxide Sheets*. *ACS Nano*. 2012; 6(12):10708-19). The graphene of larger radial sheet size can effectively form comparatively complete network structures in the matrix of the built material, and the interconnected and bridging network structure can significantly improve the composite properties of materials such as antistatic behavior, gas barrier resistance, electrical and thermal conductivity. Compared with ordinary small graphene sheets, the large graphene sheets of larger radial scale can realize and reach the above functionality of the built material with a lower addition amount. Therefore, the preparation and the large-scale production technology of the large graphene sheets are urgent and critical. At present, there have been reports of patents using the improved Hummers' Method to prepare the graphene oxide with small-sized graphite powders or expanded graphite as raw materials, while in the case with small-sized graphite powders, the oxidation efficiency is higher. According to the prior art, when the large-grained flake graphite is used as the raw material, both the oxidation efficiency and the exfoliation of the graphite oxide are poor, and the subsequent fractionation is required for the product, resulting in a low yield and a complicated process. Min Yonggang et al. (CN 103741264 A) process the graphite firstly with intercalation through the strong acids, next expansion at a high temperature, and then oxidization, centrifugation and dialysis through the Hummers' Method, and the large sheets of the graphene oxide are finally obtained. The obtained graphene products have a smaller radial sheet size (20-80 μm), a complex preparation process and a relatively high cost.

SUMMARY OF THE PRESENT INVENTION

The present invention aims to provide a method for preparing large graphene sheets in large scale with cheap and available raw materials, easy operation and simple process (efficient), high yield, large radial sheet size as well as undamaged crystal structures (high quality) to address shortcomings of the above prior art.

The method of the present invention for preparing the large graphene sheets in large scale comprises three steps of graphite oxidation, washing with dilute hydrochloric acid and heat treatment, which realizes a large-scale preparation of high-quality large graphene sheets with low cost, high efficiency, low energy consumption and environmental friendliness.

The object of the present invention is realized by means of following technical solutions.

The present invention relates to a method for preparing large graphene sheets in large scale, comprising steps of: under a mild condition, processing graphite powders with intercalation through an acid and an oxidant; washing away metal ions and inorganic ions in the graphite powders with dilute hydrochloric acid, then filtering and drying; and, after a heat treatment, obtaining the large graphene sheets. The method avoids processes of high temperature, sustained and multi-step oxidation required by the existing oxidization reduction method, and precludes a fatal flaw of traditional methods that a viscosity of graphite oxide becomes very large instantaneously due to a huge cohesion generated between sheets of the graphite oxide after water washing. A viscosity increase makes a cleaning process, for further removing ions and impurities during a graphene preparation, extraordinarily difficult, and thus longer time and larger consumption of power are required to finish washing, filtering and drying of the graphite oxide. In the meantime, the present invention effectively solves a strong Van der Waals force and cohesion arising between the sheets during a treatment of the graphite oxide in the current oxidation reduction method, and thus a problem that spacing between the sheets of the intercalated graphite oxide develops reversely, i.e. the spacing between the sheets of the graphite oxide will decrease rapidly, is effectively solved. A force increase between the sheets of the graphite oxide will make an exfoliation of oxidized graphite more difficult, which is quite negative for obtaining thinner graphene sheets by an exfoliation of the graphite oxide sheets.

Preferably, the acid comprises at least one member selected from a group consisting of concentrated sulphuric acid, concentrated nitric acid, phosphoric acid and perchloric acid.

Preferably, the oxidant comprises at least one member selected from a group consisting of potassium permanganate, potassium chlorate, sodium chlorate, potassium persulfate and potassium dichromate.

Preferably, the graphite powders comprise at least one member selected from a group consisting of natural flake graphite powders, expandable graphite powders and expanded graphite powders. A radial sheet size of the graphite powders is 300-500 μm.

Preferably, a radial scale of the prepared large graphene sheets is distributed from 20 μm to 200 μm, and a magnitude and a distribution of the radial scale can be regulated by controlling kinetic conditions such as a reactant proportion, a reaction time and an agitation rate.

Preferably, an appropriate acid amount for each gram of the graphite powders is 20-60 ml and an appropriate oxidant amount for each gram of the graphite powders is 5-10 g.

Preferably, an appropriate amount of the dilute hydrochloric acid for each gram of the graphite powders is 150-350 ml and a volume percentage concentration of the dilute hydrochloric acid is 0.5-10%.

Preferably, a temperature of the heat treatment is 500-1,050° C. According to the present invention, the heat treatment is adopted to realize a sheet exfoliation. The sheet exfoliation does not require an ultrasonic exfoliation, a prolonged high-energy shear and a high-speed grinding treatment in the traditional oxidization reduction methods. Thus, a loss of some properties of the prepared graphene, resulting from a heavy damage to a crystal structure of the graphite oxide by exposure to an intense ultrasound, a cavitation condition and an effect of a strong energy for a long time, is avoided.

Preferably, the method specifically comprises following steps of:

(A) mixing the graphite powders with the acid; slowly adding the oxidant in an ice bath; mixing evenly and reacting in the ice bath for 2-48 hours; rising a temperature to 35° C., and continuing oxidizing for 36-120 hours; diluting with water, adding hydrogen peroxide, and finally obtaining a mixed aqueous solution containing the graphite oxide;

(B) processing the mixed aqueous solution containing the graphite oxide with pump filtration, and obtaining filter cakes; firstly washing with 10% (V/V) dilute hydrochloric acid, and then washing with 0.5-1% (V/V) dilute hydrochloric acid to wash off remaining metal ions and inorganic ions; filtering, and drying; and (C) grinding the filter cakes and processing with the heat treatment for 15-30 seconds; and obtaining the large graphene sheets.

Preferably, in the step (A), an appropriate amount of the hydrogen peroxide for each gram of the graphite powders is 2-20 ml and an appropriate water amount for each gram of the graphite powders is 150-200 ml.

Preferably, in the step (B), a drying temperature is 30-85° C., and a drying time is 48-200 hours.

Preferably, in the step (C), a grinding equipment is an edge runner, a vibration mill, a turbine grinder, a jet mill, a fan mill, a sand mill, a colloid mill, a ball mill or a family-use grinder.

Compared with the prior art, the present invention has following beneficial effects.

1. The present invention uses the cheap raw materials, and has the simple process, the high efficiency and no need for water washing and for the ultrasonic exfoliation. A small amount of volatile hydrochloric acid molecules are adsorbed between the graphite oxide sheets, and during the heat treatment, oxygen-containing groups of the graphite oxide quickly break down and produce large amounts of gas to promote the sheet exfoliation. Meanwhile, the graphite oxide sheets adsorbed with the hydrochloric acid molecules can also expand and release gases to make an instant exfoliation, and thus the above dual effect realizes an efficient exfoliation of the graphite oxide and avoids disadvantages of a severe damage to the crystal structure of the graphene and a continuous smash of the radial sheet size with the ultrasonic exfoliation, so that the graphene with the large radial sheet size and the high quality is obtained, which is easy to realize an industrialized mass production.

2. The radial scale of the graphene sheets prepared by the present invention is distributed from 20 μm to 200 μm, and the magnitude and the distribution of the radial scale of the graphene can be regulated by controlling the graphite raw materials and reaction conditions. The prepared graphene has few defects, a high quality and a large specific surface area, and moreover, mechanical properties, electrical properties and thermal conductivity of the graphene are less damaged. The graphene is dispersed in N-Methyl-2-pyrrolidone, and an electrical conductivity of a film formed by pump filtration is above 600 S/cm, which is able to meet requirements of composites and electronics industries for high-quality graphene products.

BRIEF DESCRIPTION OF THE DRAWINGS

Other features, objects, and advantages of the present invention will become more apparent from reading the detailed description of non-limiting embodiments with reference to the following figures.

DETAILED DESCRIPTION OF THE PREFERRED EMBODIMENT

Figure 1:
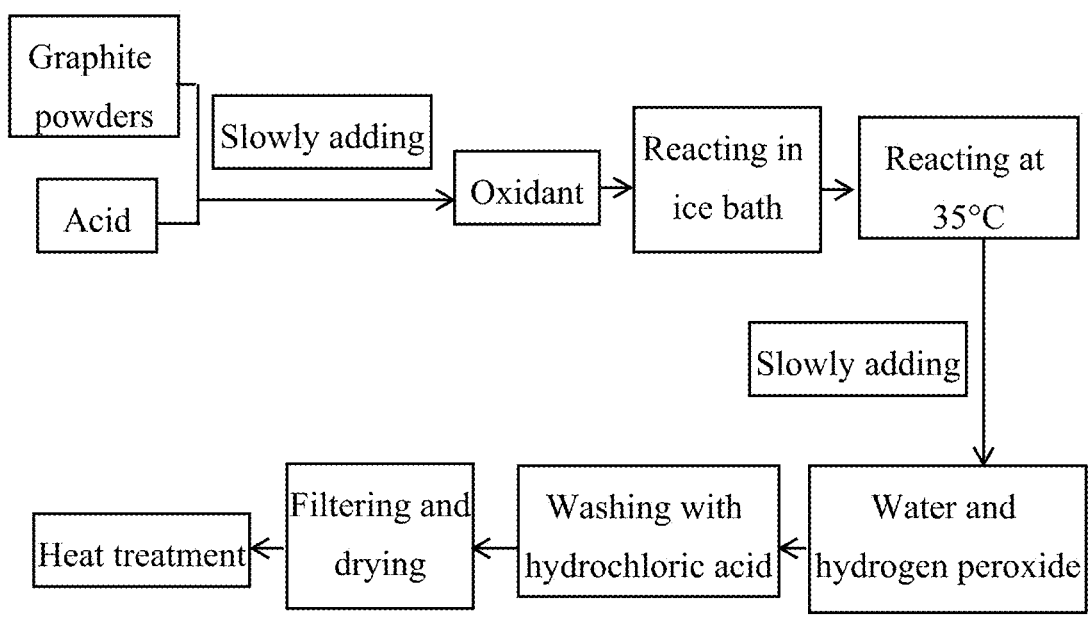
FIG. 1 is a process flow diagram of a method for preparing graphene according to the present invention.

The present invention is illustrated in detail with figures and preferred embodiments. The following embodiments will help those skilled in the art better understand the present invention, and not in any way limit the present invention. It shall be noted that several variants and improvements can be made without departing from concept of the present invention for those of ordinary skill in the art. All these fall within the protection scope of the present invention.

The present invention relates to a method for preparing large graphene sheets in large scale, comprising steps of: processing large graphite sheets with intercalation and modification through an acid and an oxidant; washing away metal ions and inorganic ions in the graphite powders with dilute hydrochloric acid, filtering, and drying; and, after a heat treatment, obtaining the high-quality large graphene sheets. The method effectively avoids a series of problems restricting an efficient preparation of high-quality graphene arising from washing graphite oxide to be neutral with water in conventional methods. The present invention specifically comprises following steps of:

(1) mixing graphite with the acid; slowly adding the oxidant in an ice bath; evenly mixing, and reacting in the ice bath for 2-48 hours; rising a temperature to 35° C., and continuing oxidizing for 36-120 hours; diluting with water, adding a certain amount of hydrogen peroxide, and obtaining a mixed aqueous solution containing graphite oxide; wherein: the graphite comprises at least one member selected from a group consisting of natural flake graphite, expandable graphite and expanded graphite, and a sheet size of the graphite is optimal from 300 μm to 500 μm; the acid (generally recognized as an acid of 98% concentration) comprises at least one member selected from a group consisting of concentrated sulphuric acid, concentrated nitric acid, phosphoric acid and perchloric acid; the oxidant comprises at least one member selected from a group consisting of potassium permanganate, potassium chlorate, sodium chlorate, potassium persulfate and potassium dichromate; a proportion of the graphite to the acid is 1 g: 20-60 ml, a proportion of the graphite to the oxidant is 1 g: 5-10 g, and a proportion of the graphite to a 20% (V/V) aqueous hydrogen peroxide solution is 1 g: 2-20 ml;

(2) processing the mixed aqueous solution containing the graphite oxide with vacuum filtration, and obtaining graphite oxide filter cakes; washing with 10% aqueous hydrochloric acid solution, washing off remaining metal ions and inorganic ions and filtering, and drying at a certain temperature; wherein: a proportion of the graphite oxide to the dilute hydrochloric acid is 1 g: 300-500 ml, a drying temperature of the graphite oxide filter cakes after filtering is 30-85° C., and a drying time of the graphite oxide filter cakes is 48-200 hours; and (3) grinding the filter cakes after washing by the dilute hydrochloric acid with a grinding equipment, and processing with the heat treatment at a certain high temperature for 15-30 seconds; and obtaining the large graphene sheets; wherein: a yield of graphene of a layer number below 10 is above 90%; the grinding equipment is an edge runner, a vibration mill, a turbine grinder, a jet mill, a fan mill, a sand mill, a colloid mill, a ball mill, or a family-use grinder; and the heat treatment of graphite oxide powders has a temperature ranging from 500-1,350° C. The preferred embodiments are illustrated in detail as follows.

First Preferred Embodiment

The first preferred embodiment relates to a method for preparing large graphene sheets in large scale, wherein a specific preparation process thereof is showed in FIG. 1, comprising steps of:

mixing 12 g 500 μm natural flake graphite with 260 ml concentrated sulphuric acid; slowly adding 60 g potassium permanganate in an ice bath; mixing evenly, and reacting in the ice bath for 2 hours; rising a temperature to 35° C.; continuing oxidizing for 48 hours; slowly adding 1.8 L deionized water and then adding 30 ml 20% (V/V) aqueous hydrogen peroxide solution; obtaining a mixed aqueous solution containing graphite oxide; processing the mixed aqueous solution containing the graphite oxide with vacuum filtration, obtaining filter cakes, washing respectively with 1 L 10% (V/V) and 1 L 0.5% (V/V) hydrochloric acid, washing off remaining metal ions and inorganic ions, and then drying at 60° C. for 48 hours; grinding the filter cakes into powders by a family-use grinder, treating for 15 s at 1,050° C., and obtaining the large graphene sheets, wherein a yield of graphene of a layer number below 10 is above 90%.

For the above obtained large graphene sheets, the graphene of a radial sheet size between 20 μm and 100 μm accounts for 50%, and for 15% over 100 μm.

Figure 2:
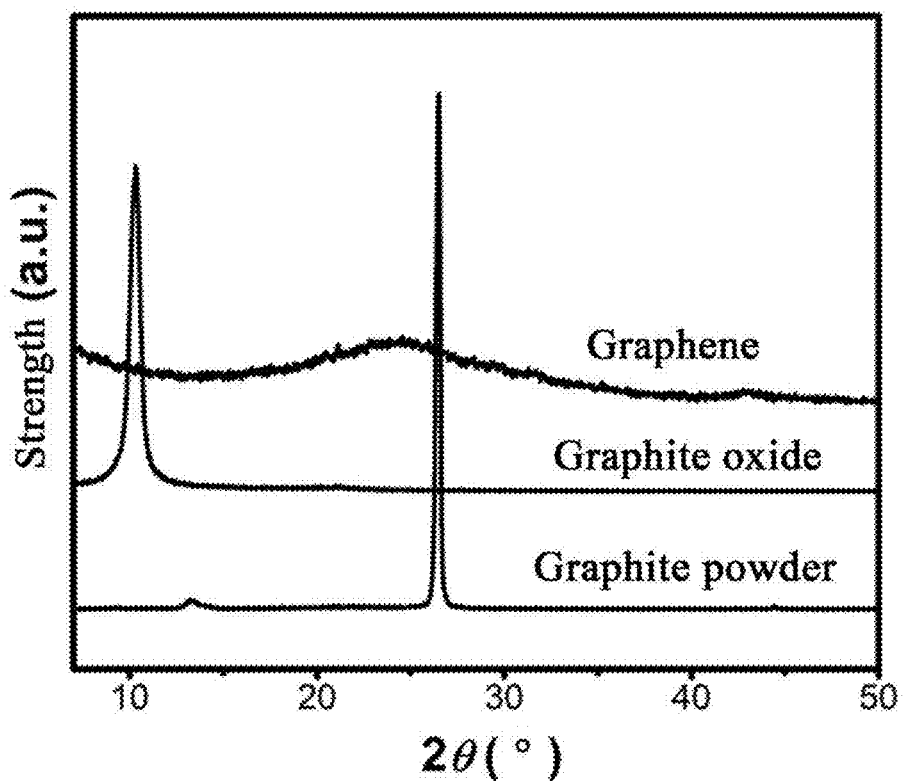
FIG. 2 is X-ray diffraction spectra of graphite, graphite oxide and graphene according to a first preferred embodiment of the present invention.

FIG. 2 is X-ray diffraction spectra of the graphite, the graphite oxide and the graphene, and as seen from FIG. 2, a characteristic peak of natural graphite powders is at 26.4°, which is a (002) crystal face of a graphite crystal. Calculated from a Bragg diffraction equation, an interlamellar spacing is 0.34 nm. When the natural graphite powders are oxidized, a (002) peak thereof disappears, and a characteristic peak of the graphite oxide is at 10.8° and is a (001) characteristic peak of a crystal face. The corresponding interlamellar spacing is 0.84 nm. And at the position of 26.4°, the graphene shows a characteristic peak (002) that is significantly widened in relation to that of the natural graphite powders, which indicates that the interlamellar spacing of the graphene is larger than that of the natural graphite powders, i.e. the natural graphite powders are exfoliated into the graphene.

Figure 3:
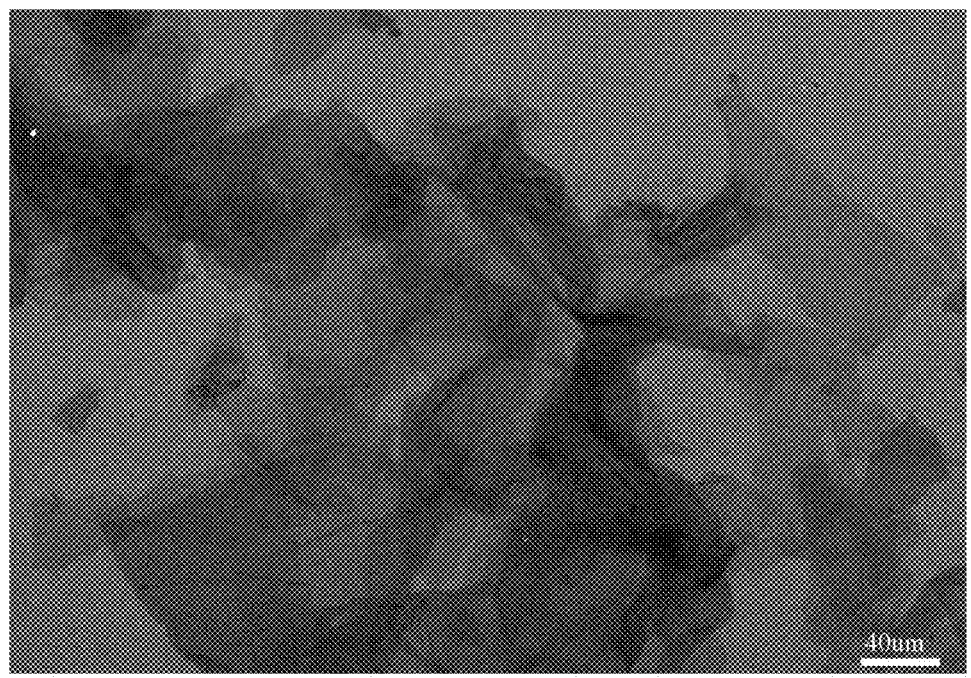
FIG. 3 is a scanning electron microscope (SEM) photo of the graphene according to the first preferred embodiment of the present invention.
Figure 4:
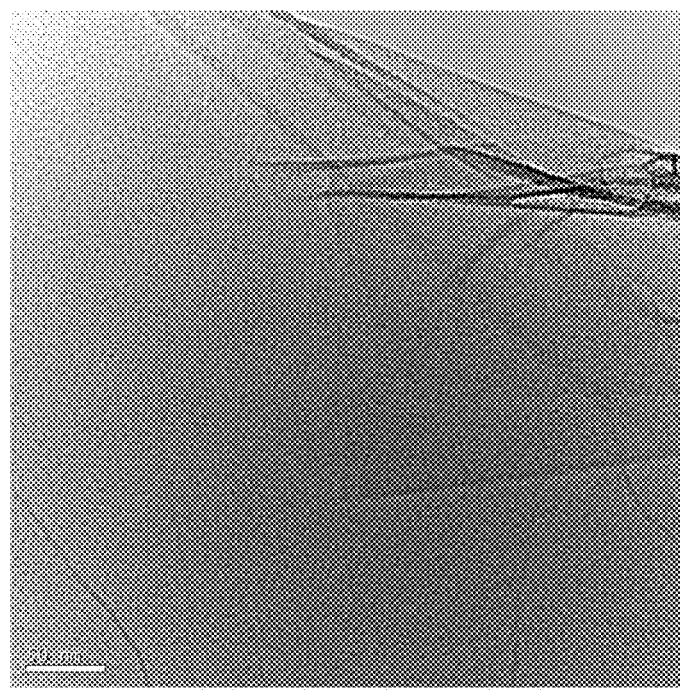
FIG. 4 is a local transmission electron microscope (TEM) photo of graphene sheets according to the first preferred embodiment of the present invention.

FIG. 3 is a scanning electron microscope (SEM) photo of the prepared graphene, and FIG. 4 is a local transmission electron microscope (TEM) photo of the graphene sheet. As seen from FIGS. 3 and 4, the graphene prepared by the present invention has a large radial sheet size, a flat sheet structure, less crystal defects and a high quality.

Second Preferred Embodiment

The second preferred embodiment relates to a method for preparing large graphene sheets in large scale, wherein a specific preparation process thereof is showed in FIG. 1, comprising steps of:

mixing 12 g 500 μm expandable graphite with 720 ml concentrated sulphuric acid; slowly adding 120 g potassium chlorate in an ice bath; evenly mixing and reacting in the ice bath for 48 hours; rising a temperature to 35° C.; continuing oxidizing for 36 hours; slowly adding 2 L deionized water and then adding 240 ml hydrogen peroxide; obtaining a mixed aqueous solution containing graphite oxide; processing the mixed aqueous solution containing the graphite oxide with vacuum filtration, obtaining filter cakes, washing respectively with 2 L 10% (V/V) and 1 L 0.5% (V/V) hydrochloric acid, washing off remaining metal ions and inorganic ions, and then drying at 85° C. for 100 hours; grinding the filter cakes into powders by a family-use grinder, treating for 30 s at 850° C., and obtaining the large graphene sheets, wherein a yield of graphene of a layer number below 10 is above 90%.

For the above obtained large graphene sheets, the graphene of a radial sheet size between 20 μm and 100 μm accounts for 65%, and for 13% over 100 μm.

Figure 5:
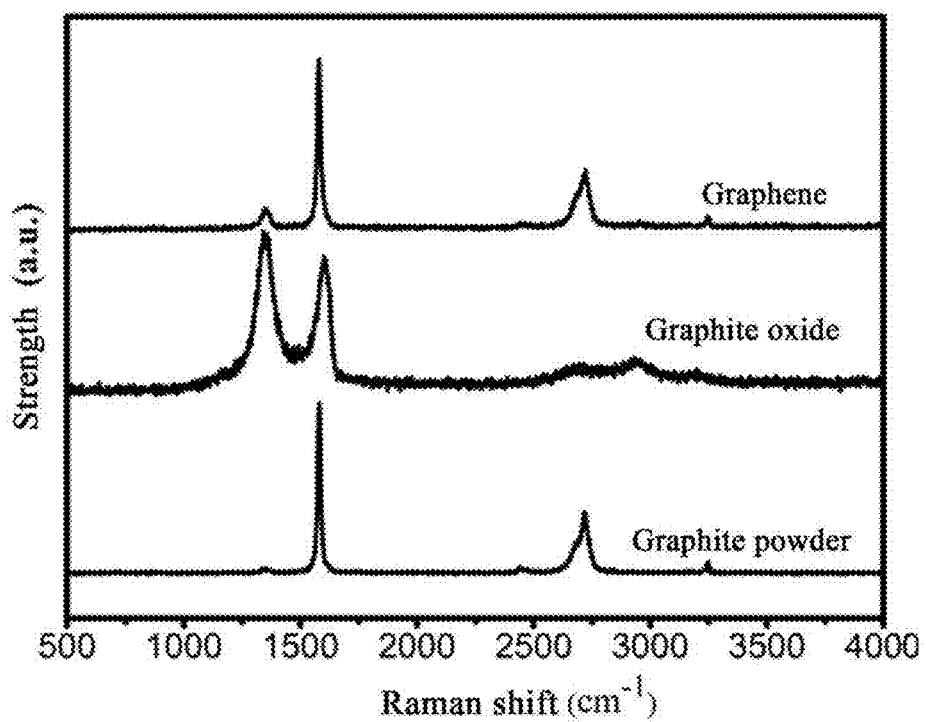
FIG. 5 is Raman spectra of graphene, graphite oxide and graphite powders according to a second preferred embodiment of the present invention.

FIG. 5 is Raman spectra of the graphene, the graphite oxide and graphite powders according to the second preferred embodiment, and main characteristic peaks of the graphene of the Raman spectra are D peak (at 1,340 cm$^{-1}$), G peak (at 1,580 cm$^{-1}$) and 2D peak (at 2,700 cm$^{-1}$). A generation process of the D peak involves a defect scattering process of incident photons, therefore, it can reflect a disorder of the graphene caused by groups, defects and edges. The more defects, the higher degree of disorder and the stronger D peak. The graphite powders have increased defects and higher D peak after oxidation and intercalation, and the D peak obviously weakens after high temperature expansion reduction, which indicates that the graphene prepared by the present invention has few defects and a high quality.

Third Preferred Embodiment

The third preferred embodiment relates to a method for preparing large graphene sheets in large scale, wherein a specific preparation process thereof is showed in FIG. 1, comprising steps of:

mixing 12 g 300 μm graphite powders with 480 ml perchloric acid; slowly adding 90 g potassium persulfate in an ice bath; evenly mixing and reacting in the ice bath for 20 hours; rising a temperature to 35° C., and continuing oxidizing for 120 hours; slowly adding 2.4 L deionized water and then adding 24 ml hydrogen peroxide; obtaining a mixed aqueous solution containing graphite oxide; processing the mixed aqueous solution containing the graphite oxide with vacuum filtration, obtaining filter cakes, washing respectively with 1.4 L 10% (V/V) and 1 L 1% (V/V) hydrochloric acid, washing off remaining metal ions and inorganic ions, and then drying at 30° C. for 200 hours; grinding the filter cakes into powders by a family-use grinder, treating for 30 s at 500° C., and obtaining the large graphene sheets, wherein a yield of graphene of a layer number below 10 is above 85%.

For the above obtained large graphene sheets, the graphene of a radial sheet size between 20 μm and 100 μm accounts for 80%, and for 5% over 100 μm.

Fourth Preferred Embodiment

The fourth preferred embodiment relates to a method for preparing large graphene sheets in large scale, wherein a specific preparation process thereof is showed in FIG. 1, comprising steps of:

mixing 12 g 400 μm expanded graphite with 240 ml phosphoric acid; slowly adding 60 g potassium dichromate in an ice bath; evenly mixing and reacting in the ice bath for 2 hours; rising a temperature to 35° C., and continuing oxidizing for 48 hours; slowly adding 1.8 L deionized water and then adding 30 ml hydrogen peroxide; and obtaining a mixed aqueous solution containing graphite oxide; processing the mixed aqueous solution containing the graphite oxide with vacuum filtration, obtaining filter cakes, washing respectively with 1 L 10% (V/V) and 1 L 0.8% (V/V) hydrochloric acid, washing off remaining metal ions and inorganic ions, and then drying at 60° C.; grinding the filter cakes into powders by a family-use grinder, treating for 15 s at 1,050° C., and obtaining the large graphene sheets, wherein a yield of graphene of a layer number below 10 is above 90%.

For the above obtained large graphene sheets, the graphene of a radial sheet size between 20 μm and 100 μm accounts for 70%, and for 8% over 100 μm.

Fifth Preferred Embodiment

Treating the graphite oxide prepared in the first preferred embodiment for 15 s at 1,350° C., and obtaining large graphene sheets, wherein a yield of graphene of a layer number below 10 is above 90%. Compared with the first preferred embodiment, the graphene obtained after treating at 1,350° C. has a higher quality, and D peak in a Raman spectrum basically disappears, namely a defect and a structural imperfection of the graphene are greatly decreased and reduced at higher temperatures. It shows that: compared with exfoliation and reduction processes at 1,050° C., the exfoliation and reduction processes of the graphite oxide at higher temperatures (e.g. 1,350° C.) lead to less defects and greater degree of reduction, namely, the high-quality graphene is reduced more thoroughly. Intrinsic properties such as electrical and thermal conductivity of the prepared large graphene sheets will be further improved.

In conclusion, according to the method for preparing the large graphene sheets in large scale provided by the present invention, the graphite intercalation process is in a mild manner, after which post-processes of the graphite oxide such as washing, filtering and drying are very simple and effective, avoiding a series of problems restricting the high-quality and efficient preparation of the graphene arising from washing the graphite oxide to be neutral with a large amount of distilled water. The present invention uses cheap raw materials, has mild conditions, a simple process, a low energy consumption and no need for water washing and an ultrasonic exfoliation, and is environmentally friendly and easy to realize the industrialized mass production. The scale distribution of the graphene prepared by the present invention is between 20 μm and 200 μm, and a regulation of the radial scale and the size distribution of the graphene sheets is achieved through selecting graphite raw materials and controlling reaction conditions. The graphene prepared by the present invention has few defects and a high quality, and is basically able to keep intrinsic properties thereof, especially the electrical and thermal conductivity. The electrical conductivity of the film formed by pump filtration of graphene dispersion liquid is above 600 S/cm, which is able to satisfy the demand for high-quality graphene products of such fields as utilizing mechanical properties of the graphene film, fiber and composites and playing the functional features of the electronic material and functional coating.

Preferred embodiments of the present invention are described above. It shall be understood that the present invention is not limited to the above preferred embodiments, and those skilled in the art can make different variants and modifications within the scope of the claims, and it shall not affect the substance of the present invention.

What is claimed is:

1. A method for preparing large graphene sheets in large scale, comprising steps of: under a mild condition, processing graphite powders with intercalation through an acid and an oxidant, wherein a radial sheet size of the graphite powders is 300-500 μm; washing away metal ions and inorganic ions in the graphite powders with dilute hydrochloric acid, then filtering and drying; and, after a heat treatment, obtaining the large graphene sheets, wherein a temperature of the heat treatment is 500-1,350° C., and a radial scale of the large graphene sheets is distributed from 20 μm to 200 μm.

2. The method for preparing the large graphene sheets in large scale, as recited in claim 1, wherein the acid comprises at least one member selected from a group consisting of concentrated sulphuric acid, concentrated nitric acid, phosphoric acid and perchloric acid.

3. The method for preparing the large graphene sheets in large scale, as recited in claim 1, wherein the oxidant comprises at least one member selected from a group consisting of potassium permanganate, potassium chlorate, sodium chlorate, potassium persulfate and potassium dichromate.

4. The method for preparing the large graphene sheets in large scale, as recited in claim 1, wherein the graphite powders comprise at least one member selected from a group consisting of natural flake graphite powders, expandable graphite powders and expanded graphite powders.

5. The method for preparing the large graphene sheets in large scale, as recited in claim 1, wherein an appropriate acid amount for each gram of the graphite powders is 20-60 ml and an appropriate oxidant amount for each gram of the graphite powders is 5-10 g.

6. The method for preparing the large graphene sheets in large scale, as recited in claim 1, wherein an appropriate amount of the dilute hydrochloric acid for each gram of the graphite powders is 150-350 ml and a volume percentage concentration of the dilute hydrochloric acid is 0.5-10%.

7. A method for preparing large graphene sheets in large scale, comprising steps of: under a mild condition, processing graphite powders with intercalation through an acid and an oxidant; washing away metal ions and inorganic ions in the graphite powders with dilute hydrochloric acid, then filtering and drying; and, after a heat treatment, obtaining the large graphene sheets; wherein:

the acid comprises at least one member selected from a group consisting of concentrated sulphuric acid, concentrated nitric acid, phosphoric acid and perchloric acid;

the oxidant comprises at least one member selected from a group consisting of potassium permanganate, potassium chlorate, sodium chlorate, potassium persulfate and potassium dichromate;

the graphite powders comprise at least one member selected from a group consisting of natural flake graphite powders, expandable graphite powders and expanded graphite powders;

a radial sheet size of the graphite powders is 300-500 μm;

an appropriate acid amount for each gram of the graphite powders is 20-60 ml and an appropriate oxidant amount for each gram of the graphite powders is 5-10 g;

an appropriate amount of the dilute hydrochloric acid for each gram of the graphite powders is 150-350 ml and a volume percentage concentration of the dilute hydrochloric acid is 0.5-10%;

a temperature of the heat treatment is 500-1,350° C.; and a radial scale of the large graphene sheets is distributed from 20 μm to 200 μm.

* * * * *